United States Patent [19]

Ranade et al.

[11] 4,454,300

[45] Jun. 12, 1984

[54] BLENDS OF VINYL HALIDE-POLYOLEFIN GRAFT POLYMERS AND SMA POLYMERS

[75] Inventors: Gautam R. Ranade, Grand Island; Gideon Salee, Williamsville, both of N.Y.

[73] Assignee: Occidental Chemical Corporation, Niagara Falls, N.Y.

[21] Appl. No.: 541,396

[22] Filed: Oct. 12, 1983

[51] Int. Cl.$^3$ ..................... C08L 51/04; C08L 51/06; C08L 35/06

[52] U.S. Cl. ........................ 525/71; 525/74; 524/504

[58] Field of Search ............................ 525/74, 71, 290

[56] References Cited

U.S. PATENT DOCUMENTS

| | | | |
|---|---|---|---|
| 3,355,517 | 11/1967 | Müllner | 525/290 |
| 3,626,031 | 12/1971 | Chambers | 525/192 |
| 3,626,033 | 12/1971 | Keskkula | 525/74 |
| 3,632,839 | 1/1972 | Young | 525/192 |
| 3,789,083 | 1/1974 | Dumoulin | 525/317 |
| 3,812,204 | 5/1974 | Natta et al. | 525/290 |
| 3,906,059 | 9/1975 | Oba et al. | 525/290 |
| 3,978,162 | 8/1976 | Nakanishi | 525/290 |
| 4,169,870 | 10/1979 | Takahashi | 525/315 |
| 4,195,137 | 5/1980 | Walker | 525/317 |
| 4,311,806 | 1/1982 | Dufour | 525/71 |
| 4,329,272 | 5/1982 | DuFour | 524/288 |
| 4,339,554 | 7/1982 | Doak | 525/63 |
| 4,371,666 | 2/1983 | Bourland | 525/207 |

FOREIGN PATENT DOCUMENTS 55086 6/1982 European Pat. Off. .

OTHER PUBLICATIONS

L. G. Bourland et al.–"More-Heat-Resistant Alloys Open up New Uses for P.VC", Plastic Engineering–May 1983.

*Primary Examiner*—Carman J. Seccuro
*Attorney, Agent, or Firm*—James F. Tao; James F. Mudd

[57] ABSTRACT

A novel thermoplastic polymer composition comprises a blend of a high impact vinyl halide polymer, particularly a vinyl halide-polyolefin graft polymer, and a copolymer of styrene and maleic anhydride and modifications thereof.

15 Claims, No Drawings

BLENDS OF VINYL HALIDE-POLYOLEFIN GRAFT POLYMERS AND SMA POLYMERS

BACKGROUND OF THE INVENTION

The present invention relates to thermoplastic polymer blends capable of being molded into plastic articles having improved properties. The polyblends of the present invention contain a graft copolymer of a vinyl halide, or of a vinyl halide and a comonomer copolymerizable therewith on a polyolefin component. Such copolymers are hereinafter referred to as "vinyl halide-polyolefin graft copolymers". The present blends also contain a polymer composition hereinafter referred to as "SMA polymers".

Polyvinyl halide, especially polyvinyl chloride polymers are widely used thermoplastic materials having many favorable properties. Such conventional non-graft vinyl halide polymers do not have heat distortion temperatures which are sufficiently high to adapt such polymers to much more wide use. Moreover, such polymers, especially rigid polyvinyl halide polymers, do not have a high impact resistance at ambient or subambient temperatures. Thus, at ambient temperature, i.e., at about 20° C., corresponding to about 68° F., the notched Izod impact resistance of vinyl halide homo- and copolymers is only of the order of about 0.4 to less than about 1 ft-lb/in. At subambient temperatures, e.g., down to −20° F. or lower, the notched Izod impact resistance of these polymers becomes vanishingly small or negligible.

It has been previously proposed to add minor amounts of an appropriate polymer additive, or additives, to improve ambient impact resistance of conventional polyvinyl polymer compositions. Usually, such additives are useful in ranges from about 3 to about 15 percent by weight of the polyvinyl halide polymer. Among the materials which have been found acceptable as polyvinyl halide impact modifiers are ABS polymers. Such impact modifiers moderately enhance the ambient temperature impact resistance of conventional vinyl halide polymers, i.e., generally raise the ambient temperature notched Izod impact resistance of the polymer to about 2 to 10 ft-lbs/in. However, these impact modifiers are relatively ineffective in imparting a satisfactory sub-ambient temperature impact resistance to the polymer, i.e., the −20° F. notched Izod impact resistance of the polymer containing the impact modifier is well below 1 ft-lb/in and usually is about 0.4 to 0.5 ft-lb/in.

Recently, vinyl halide-polyolefin graft copolymers have been developed to be a commercial reality. Such copolymers are produced by polymerization of vinyl halide (or a monomer mixture of vinyl halide and copolymerizable ethylenically unsaturated comonomer) in the presence of a polyolefin elastomer. Such reaction yields a polymer product which contains vinyl halide polymer chains bound, i.e., grafted at various sites along the chain of the trunk olefin polymer as well as ungrafted vinyl halide polymer and ungrafted polyolefin. The graft polymer product, especially the graft polymer product prepared by a liquid phase bulk polymerization reaction, has improved impact resistance at both ambient temperature and sub-ambient temperatures, compared to the aforementioned conventional, i.e., ungrafted, vinyl halide polymers, even when the latter are blended with a conventional polyvinyl halide impact modifying polymer additive.

The bulk polymerization-prepared graft polymer product is even distinguished from the corresponding graft polymer prepared by a non-bulk polymerization technique, e.g., suspension polymerization, by an enhanced impact resistance at both low and ambient temperature and by breakage by the desirable ductile breakage mode rather than by an undesirable brittle breakage mode.

Recently polymer products with improved properties have been prepared by blending the vinyl halide polyolefin graft polymers with ABS polymers. Such products are disclosed in copending application Ser. No. 250,957, filed Oct. 31, 1980, now U.S. Pat. No. 4,433,101.

It has now been found that further improved polymer products can be prepared by blending the vinyl halide polyolefin graft polymers, especially those produced by a liquid phase bulk polymerization reaction, and—"SMA polymers" which are described hereinafter.

The molecular miscibility exhibited by the matrix phases of these polymeric components of the invention offers several advantages. The miscibility provides excellent mechanical compatibility. Superior weld line strengths and improved surface properties can be obtained when the polymeric components exhibit molecular miscibility. A problem of possible deterioration of the properties due to phase separation during or after processing may exist for an immiscible blend. This is likely in case of the injection molding process which typically uses very high shear rates. This problem is unlikely in a case where the polymeric components exhibit molecular miscibility.

SUMMARY OF THE INVENTION

The present invention relates to a moldable thermoplastic polymer composition which is comprised of a blend of a high impact vinyl halide polymer and an SMA polymer. The preferred high impact vinyl polymer is a vinyl halide hydrocarbon polyolefin graft polymer. By polyvinyl halide-polyolefin graft polymer is meant the product of the graft polymerization of vinyl halide in the presence of an olefin trunk polymer reactant as further described below.

By SMA polymer is meant a polymer of styrene and maleic anhydride, and such polymers that are modified by blending with or reaction with an olefin-diolefin modified polymer such as an ethylene propylene/polyene modified polymers as well as diolefin polymers such as polybutadiene. Such SMA polymers are found to exhibit molecular miscibility with the vinyl halide-polyolefin graft polymers.

The blends of this invention have beneficial properties when compared to prior art blends.

DETAILED DESCRIPTION OF THE INVENTION AND THE PREFERRED EMBODIMENTS THEREOF

While proportions of the SMA polymer in the present blend can range typically from less than about 1% to more than about 99 weight percent of SMA polymer (with the balance being the high impact vinyl polymer or the graft polymer component), it is preferred to provide blends which contain from about 20% up to about 80% of SMA polymer to achieve the desired enhanced properties.

Preferred blends of the invention contain from about 60% to about 40% of the high impact vinyl polymer or graft polymer component and from about 40% to about 60% of the SMA polymer component, said percentages being based on the weight of the blend of the graft polymer and the SMA polymer.

THE HIGH IMPACT VINYL HALIDE POLYMER

High impact vinyl halide polymers in high impact PVC are generally produced by blending PVC or other vinyl halide polymer with an impact modifier for a vinyl halide polymer.

Several different types of impact modifiers can be used to prepare high impact polyvinyl chloride formulations. These modifiers can be of the MBS (methacrylate-butadiene-styrene) type, ABS (acrylonitrile-butadiene-styrene) type, MABS (methacrylate-acrylonitrile-butadiene-styrene) type, chlorinated polyethylene type or copolymers of ethylene, such as ethylene vinyl acetate. The impact modifier can also be all acrylic type, such as, Durastrength 200 (M&T Chemical Company). Some of the examples of ABS, MBS or MABS impact modifiers are Blendex series of modifiers by Borg Warner Company (Blendex 301, Blendex 435, Blendex 301, Blendex 101, Blendex 121, etc.). Additional suitable impact modifiers used to prepare high impact PVC formulations can be Acryloid series of impact modifiers by Rohm and Haas Company, such as, Acryloid KM-653, Acryloid KM-641, Acryloid KM-323B, Acryloid KM-611 and Acryloid KM-330, etc.

The proportions of these modifiers in the polyvinyl chloride or other vinyl halide polymer can vary depending on the type and efficiency of the modifier, from 3 parts to 30 parts by weight per hundred parts of the resin. Preferably, the loading of modifier would be in the range from 5 parts to 15 parts by weight per hundred parts of the resin.

The impact modifiers for vinyl polymers are described in (1) Encyclopedia of PVC, Edited by Leonard J. Nass, Vol. 2, Marcel Dekker, Inc. N.Y. and Basel.
(2) Technical Bulletin on Durastrength-200 Impact Modifier by M&T Chemical Company.
(3) Technical Bulletin on Acryloid KM-330 Modifier, Rohm and Haas Company
(4) Technical Bulletin on Blendex series of modifiers by Borg and Warner Company.

THE POLYVINYL HALIDE-POLYOLEFIN GRAFT COPOLYMER COMPONENT

The polyvinyl halide copolymer component is a graft copolymer of a vinyl halide (or of a vinyl halide and a comonomer copolymerizable therewith) and a polyolefin elastomer. The graft polyvinyl halide component may suitably be obtained by polymerizing a mixture of vinyl halide monomer with one or more ethylenically unsaturated comonomers (or more conveniently a vinyl halide monomer alone) in the presence of an olefin trunk polymer reactant.

The vinyl halide-graft copolymers of the polyolefin elastomers are prepared by polymerizing the vinyl halide in the presence of about 0.05 to about 20 percent, preferably about 1 to about 20 percent, based on the weight of vinyl halide monomer of the above-described polyolefin elastomer. Preparation of such vinyl halide-polyolefin graft copolymer according to emulsion and suspension polymerization techniques is described in G. Natta et al., U.S. Pat. No. 3,812,204, the disclosure of which is incorporated herein by reference. Preparation of such vinyl halide-polyolefin graft copolymer by vapor phase and solution polymerization techniques are described, respectively, in J. Dumoulin et al., U.S. Pat. No. 3,789,083 and F. M. Rugg et al. U.S. Pat. No. 2,947,719, the disclosures of which are incorporated herein by reference. Desirably, the preparation of the vinyl halidepolyolefin graft copolymers useful as the polyvinyl halide component of the composition of the invention is effected by a bulk liquid phase polymerization technique as described by A. Takahashi, U.S. Pat. Nos. 4,071,582; 4,163,033 and 4,169,870, and by L. E. Walker, U.S. Pat. Nos. 4,007,235; 4,067,928 and 4,195,137 the disclosure of which Takahashi and Walker patents is incorporated herein by reference.

MONOMER COMPONENT

Suitable ethylenically unsaturated comonomer materials which can be used include: mono-olefinically unsaturated esters including vinyl esters, such as vinyl acetate, vinyl stearate, vinyl benzoate, and vinyl-p-chlorobenzoates; alkyl methacrylates, such as methyl, ethyl, propyl and stearyl methacrylates; alkyl crotonates, such as octyl crotonate; alkyl acrylates, such as methyl, ethyl, hexyl and stearyl acrylates; hydroxyether and tertiary butylamino acrylates, such as 2-ethoxy ethyl acrylate; isopropenyl esters, such as isopropenyl acetate; and other comonomers disclosed in the aforesaid patents of Takahashi.

POLYOLEFIN COMPONENT

The polyolefin component can be a homopolymer, bipolymer, terpolymer, tetrapolymer or higher copolymer of olefinic monomers. The olefin polymers can also contain the residue of a polyene, e.g., a non-conjugated diene as a monomer unit. Preferably, the polyolefin is an elastomer.

Olefin homopolymers may be obtained by the polymerization of a suitable monomer, such as ethene, propene, i.e., propylene, butene-1, isobutene, octene or 5-methylhexene-1.

Suitable comonomers for use in preparing the polyolefins are those utilized to prepare the olefin homopolymers as listed above, e.g., propene or butene-1 with ethene and the like. Suitable termonomers are those utilized to prepare homopolymers and copolymers as disclosed above, such as propene, ethene and the like, as well as a polyene. Especially suitable polyene-derived ter- and higher copolymers can be prepared from olefin monomer mixtures containing up to 15 percent, preferably up to about 6 percent by weight, of the polyene (preferably non-conjugated), such as dicyclopentadiene, cyclo-octadiene and other dienes with linear or cyclic chains. The polyolefin used may also be a halogenated polyolefin, such as a chlorinated, brominated or fluorinated polyolefin.

Preferably, however, the polyolefin is a hydrocarbon polyolefin, that is, a polyolefin containing only carbon and hydrogen atoms.

The polyolefins used are characterized by being soluble, partially soluble or dispersible at ambient temperatures and pressure in the vinyl chloride graft copolymer component, and in having, typically, monomeric units of 2 to 8 carbon atoms. The weight average molecular weight of the olefin polymers, copolymers, terpolymers and tetrapolymers can vary from about 50,000 to about 1,000,000 and higher. Preferred as polyolefin elastomers for use in preparing vinyl halide graft polymers for use in the invention are ethene propene polyolefin elastomers and ethene-propene-diene polyolefin elastomers.

More particularly, the hydrocarbon olefin polymers which are suitably employed as trunk polymer reactant in the preparation of the present graft polymers is an elastomer having a weight average molecular weight of about 50,000 to 1,000,000, preferably of about 50,000 to 300,000 which is soluble, partially soluble or dispersible in the liquid phase polymerization reaction mixture. The trunk polyolefin reactant is suitably selected from the group consisting of:

(a) a homopolymer of an aliphatic hydrocarbon olefin monomer of 2 to 8 carbon atoms;

(b) a copolymer of 2 or more of said olefin monomers; and (c) a polymer of at least one of said olefin monomers and no more than 15 percent, based on the weight of the polymer, of a non-conjugated aliphatic hydrocarbon polyene of 4 to 18 carbon atoms wherein all of the carbon-to-carbon double bonds do not form a conjugated system.

THE SMA POLYMER COMPONENT

The SMA polymer is a copolymer of styrene and maleic anhydride, optionally modified with other monomers and polymers. Thus the styrene and maleic anhydride can be co-reacted with monomers, such as methyl methacrylate, or polymers, such as polybutadiene. The co-reacted polymers can be blended with other polymers such as ABS polymers (graft-copolymer of acrylonitrile and styrene with polybutadiene and blends of acrylonitrile butadiene copolymer with styrene acrylonitrile copolymer).

Suitable SMA polymers are disclosed in U.S. Pat. No. 3,509,110, disclosure of which is incorporated herein by reference. While the patent is directed to a particular process for making the SMA polymer, the patent is appropriate for disclosing the basic SMA polymer composition. Thus, the SMA polymers, basically comprise a copolymer of a vinyl aryl monomer and an ethylenically unsaturated dicarboxylic acid. As shown in the patent the polymer may be formed by reacting the vinyl aryl monomer with a half ester of an ethylenically unsaturated dicarboxylic acid.

Aryl vinyl monomers useful in the making of the SMA polymers include styrene, ortho-methylstyrene, meta-methylstyrene, para-methylstyrene, ethylstyrene, dimethylstyrene, divinylbenzene, alpha-methylstyrene, para-methoxystyrene, para-chlorostyrene, 2,4-dichlorostyrene, 2,5-dichlorostyrene, parabromostyrene, alpha-methyl-p-methylstyrene, para-isopropylstyrene, vinylnaphthalene and the like. Mixtures of two or more of these aryl vinyl monomers may be used if desired.

The half esters of an ethylenically unsaturated dicarboxylic acid are prepared from the following acids: maleic acid, fumaric acid, itaconic acid, citraconic acid, mesaconic acid, ethyl maleic acid, methyl itaconic acid, chloromaleic acid, dichloro-maleic acid, bromomaleic acid, dibromomaleic acid and the like.

The half esters are formed from the ethylenically unsaturated dicarboxylic acid or its anhydride (or mixtures of the same) and the desired alcohol. Suitable alcohols are the primary and secondary alkanols containing up to 6 carbon atoms, such as methyl, alcohol, ethyl alcohol, n-propyl alcohol, n-butyl alcohol, sec-butyl alcohol and n-pentyl alcohol; halogenated alkanols having up to 6 carbon atoms, such as 2,3-dichloro-1-propanol and 2-bromo-1-propanol; arylakyl alcohols such as benzyl alcohol; cyelic alcohols having up to 6 carbon atoms, such as cyclopentanol, cyclohexanol and tetrahydrofurfuryl alcohol; ether alcohols such as 2-butoxy ethanol and the ethyl ether of diethylene glycol; phosphorous containing alcohols such as diethyl monobutanol phosphate; nitrogen containing alcohols such as N-N-dimethyl ethanol amine, and the like.

The aryl vinyl monomer and ester of an ethylenically unsaturated dicarboxylic acid or anhydride are reacted in the preparation of about 50 to 95 weight percent monovinyl aromatic compound with the remainder being acid or anhydride.

Other suitable SMA polymers are prepared in accordance with U.S. Pat. No. 4,278,768, the disclosure of which is incorporated herein by reference. This patent teaches that SMA polymers can be prepared by direct copolymerization of a monovinyl aromatic monomer with an ethylenically unsaturated dicarboxylic acid anhydride by continuous controlled addition of the more reactive anhydride monomer to produce the copolymer of the desired composition.

The monovinyl aromatic monomers useful in the copolymers are styrene, alpha-methylstyrene, nuclear-methylstyrenes, ethylstyrene, isopropylstyrene, tertbutylstyrene, chlorostyrenes, dichlorostyrenes, vinylnaphthalene and mixtures of these.

Suitable anhydrides are the anhydrides of maleic acid, fumaric acid, itaconic acid, citraconic acid, mesaconic acid, ethyl maleic acid, methyl itaconic acid, chloromaleic acid, dichloromaleic acid, bromomaleic acid, dibromomaleic acid, and mixtures thereof and the like.

The anhydride copolymers may contain from 5 to 50 mole percent of anhydride and 95 to 50 mole percent of monovinyl aromatic monomer.

For the rubber-modified copolymers, the starting copolymers may be any of the above anhydride copolymers into which 5 to 40 percent by weight of one of the known rubbers has been incorporated. The rubbers may be incorporated into the anhydride copolymers by blending, mixing, or copolymerizing the monomers in the presence of the rubber. A method of preparing the rubber-modified anhydride copolymer is that taught in U.S. Pat. No. 3,919,345, wherein a rubber is dissolved in monovinyl aromatic monomer, polymerization initiated and ethylenically unsaturated dicarboxylic acid anhydride is added continuously to the polymerizing mixture at a rate sufficient to maintain the concentration of anhydride low.

Suitable rubbers, or elastomers, include conjugated 1,3-diene rubbers, styrene-diene copolymer rubbers, acrylonitrile-diene copolymer rubbers, ethylene-propylene-diene terpolymer rubbers, acrylate-diene copolymer rubbers, and mixtures thereof.

Preferred rubbers are diene rubbers such as homopolymers of conjugated dienes such as butadiene, isoprene, chloroprene, and piperylene and copolymers of such dienes with up to 50 mole percent of one or more copolymerizable mono-ethylenically unsaturated monomers, such as styrene, substituted styrenes, acrylonitrile, methacrylonitrile and isobutylene.

Other suitable SMA polymers are prepared as described in U.S. Pat. No. 4,311,806, the disclosure of which is incorporated herein by reference. This patent teaches rubber-modified copolymers of a vinyl aryl monomer and unsaturated dicarboxylic acid anhydride. The basic polymer may also include a termonomer selected from acrylates and methacrylates and unsaturated nitriles wherein the relative proportion of monomers are 50 to 85 percent of the vinyl aryl monomer, 15 to 30 percent of the anhydride and 0 to 20 percent of the termonomer wherein the monomers are polymerized in the presence of 5 to 25 percent by weight of a rubber having a glass transition temperature below 0° C. The patentees also provide for blending such SMA polymers with graft copolymer of from 20 to 40 percent by weight of a monomer selected from the group comprising methyl methacrylate and acrylonitrile and 80 to 60% by weight of a vinyl aromatic monomer said copolymer being grafted onto from 10 to 60%, based on the weight of the composition, of a substrate rubber having a glass transition temperature below 0° C.

Styrene is preferably used in forming these polymers, but the styrene can be replaced in whole or in part by other vinylaromatic monomers such alphamethyl styrene, chlorostyrene, bromostyrene, p-methyl styrene and vinyl toluene. Similarly the maleic anhydride can be replaced in whole or in part by another unsaturated dicarboxylic anhydride such as itaconic, aconitic or citraconic anhydride. The termonomer, where present is most preferably methyl methacrylate.

The proportions of the monomers preferably employed give an anhydride content of from 20 to 30% and a methyl methacrylate content of 5 to 15%.

The SMA polymer comprises 5 to 25% by weight of the rubber component and preferably from 10 to 25% by weight.

The rubber is conventionally a diene rubber such as polybutadiene or a butadiene based block or radial-block rubber. Other rubbers such as EPDM rubber, polypentenamer, polyisoprene, polychloroprene, polyacrylate rubbers and the like can, if desired, also be used.

Rubber modified copolymers are prepared by polymerizing the monomers in the presence of the rubber in such a way that a uniform copolymer of the polymerizing monomers is grafted on to the rubber substrate and a matrix copolymer of essentially the same composition as the graft copolymer is simultaneously generated. Suitable methods of producing such rubber modified copolymers are well known in the art and a typical process is described in U.S. Pat. No. 3,919,354.

The optional additional polymer component used with the SMA polymer is typically an ABS or MBS type polymer that is to say a diene rubber substrate grafted with styrene and either acrylonitrile, methyl methacrylate or a mixture of these monomers. However the rubber need not be the conventional polybutadiene or butadiene/styrene copolymer since any rubber with a glass transition temperature below 0° C. can be used. Such rubbers include those which may provide the substrate for the SMA polymer described above.

The presence of the optional additive polymer component confers additional benefits in terms of impact strength and modulus so that the inclusion of from 10 to 35% by weight of the component in the polyblends of the invention is a preferred feature.

OPTIONAL ADDITIVES

The compositions of the invention can also contain various functional additives which additives are conventional in the preparation of vinyl halide polymer molding compositions. Typically, these additives include thermal and/or light stabilizers as well as external and internal lubricants and processing aids for the graft vinyl halide resin component and other polymers of the blends of the invention.

Stabilizers suitable for use in making the vinyl halide graft polymer compositions of the invention include materials known to stabilize polyvinyl halide against the degradation action of heat and/or light. They include known stabilizers, both organic and inorganic, such as metal salts of mineral acids, salts of organic carboxylic acids, e.g. carboxylic acids of 6 to 18 carbon atoms, organo-tin compounds, epoxides, amine compounds and organic phosphites. Conveniently, an organo-tin compound, such as a methyl tin mercaptide, is employed as a stabilizer.

A more detailed description of suitable stabilizers, lubricants and processing aids for incorporation into the compositions of the invention is presented in U.S. Pat. No. 4,319,002, the disclosure of which is incorporated herein by reference.

Additional classes of additives known for use in polyvinyl halide resins which can be added optionally to the compositions of the invention in addition to the aforementioned stabilizers, lubricants and processing aids include pigments, dyes and fillers as described in L. R. Brecker, *Plastics Engineering.* March 1976, "Additives 76", pages 3–4, the disclosure of which is incorporated herein by reference.

In general, the amount of each type of the aforementioned optional additive employed in the present composition is about 0.01 to about 5 weight percent, preferably about 0.1 to about 3 weight percent, based on the total resin composition.

The compositions of the invention are essentially of the rigid vinyl halide resin type which contain no more than about 10 weight percent of a plasticizer for vinyl halide grade polymer and preferably are free of said plasticizing additive. Typical suitable plasticizer additives (which are generally organic compounds) conventionally employed in polyvinyl halide compositions include, for example, the esters of aliphatic alcohols of medium chain length of about 7 to 11 carbon atoms, with phenyl dicarboxylic acids, such as di-n-octyl phthalate and di-iso-nonyl phthalate as well as organic phosphate esters, such as cresyl-diphenyl-phosphate and octyl diphenyl-phosphate. The chemical structure and technology of plasticizers conventionally employed in polyvinyl halide compositions is more particularly discussed in L. R. Brecker, op. cit. page 5, the disclosure of which is incorporated herein by reference.

PREPARATION OF BLENDS

The compositions of the invention can be prepared by conventional milling and molding techniques. Generally, the component polymers (and, if desired, the above-described optional additives) are added as a particulate solid mixture to a roll mill or a Banbury type mixer and milled at an elevated temperature conventional for processing rigid vinyl halide polymer compositions. The resultant polymer blend obtained as a product from the milling and mixing operation is molded by either an injection or compression molding technique or extruded to produce articles of particular desired shapes at elevated temperature and pressure conditions which are conventional in molding rigid polyvinyl halide compositions. Desirably, an injection molding technique is employed to prepare the aforementioned articles which can be in various shapes including bars, plates, rings, rods, as well as sheets and films. Physical or chemical blowing agents can also be added to the moulding compounds according to the invention in order to produce a foam structure under suitable operating conditions.

In addition to the above-mentioned additives, other polymeric materials can be blended with the blend compositions of this invention.

THE EXAMPLES

The following examples further illustrate the various aspects of the invention but are not intended to limit it. Various modifications can be made in the invention without departing from the spirit and scope thereof. Where not otherwise specified in this specification and claims, temperatures are given in degrees centigrade, and all parts and percentages are by weight.

In the following examples, blends were prepared of the following polymer components:

VINYL POLYMER—A

A graft polymer of vinyl chloride and an EPDM elastomer prepared in a two-stage mass polymerization process such as described in U.S. Pat. No. 4,071,582. The EPDM elastomer was a copolymer of ethylene, propylene and ethylidene norbornene and was present in the polymer in a proportion of about 14 weight percent. The ethylene to propylene ratio was approximately 60 to 40. The graft polymer had a number average molecular weight of 24,000, a weight average molecular weight of 89,900 and a ratio of weight to number average molecular weight of 3.74. The graft polymer was compounded in a Henschel mixer using two parts of Thermolite T-31 stabilizer, two parts of Acryloid K-120N processing aid manufactured by the Rohm & Haas Company, 1.5 parts of Aldo MS lubricant manufactured by the Glyco Chemical Company, and 0.25 part of calcium stearate lubricant, all parts by weight per 100 parts by weight of the graft polymer.

VINYL POLYMER—B

A graft polymer of vinyl chloride and an EPDM elastomer as in Vinyl Polymer A except that the proportion of EPDM elastomer was about 7 percent. The graft polymer was compounded in the same manner and using the same formulation as in the case of Vinyl Polymer A.

SMA POLYMER—I AND II

The impact modified copolymers of styrene and maleic anhydride sold commercially as Cadon 112 and Cadon 127 by Monsanto Company shall be referred to herein as SMA Polymers I and II, respectively. These polymers are believed to be made according to U.S. Pat. No. 4,223,096. These impact modified compositions are also described in U.S. Pat. No. 4,311,806.

SMA POLYMER III

An impact modified copolymer of styrene and maleic anhydride sold commercially as Dylark-700 by Atlantic Richfield Company. Dylark-700 contains about 83 weight percent styrene, 7.5 weight percent maleic anhydride and 9.1 weight percent polybutadiene.

SMA POLYMERS IV AND V

The copolymers of styrene maleic anhydride sold commercially as Dylark-232 and Dylark-332 by Atlantic Richfield Company shall be referred to herein as SMA Polymers IV and V respectively. Dylark 232 contains about 72 weight percent styrene and 8 weight percent maleic anhydride. Dylark 332 contains about 86 weight percent styrene and about 14 weight percent maleic anhydride.

All polymers used in these examples were dried before preparing the blends. The blends were prepared on a two-roll Farrell mill heated using a hot oil system. A front roll temperature of 360° F. and a back roll temperature of 340° F. was used. The milling time was kept to a minimum necessary for obtaining good mixing, normally about 4 to 5 minutes. Due care was taken to obtain a good lateral mixing on the mill. The blend was removed from the mill in the form of a sheet and quickly cut into small pieces. These pieces were coarse ground after cooling. The injection molded tensile and flexural bars were used for evaluating mechanical properties. The injection molding of samples having appropriate ASTM configurations was carried out using an Arburg injection molding machine (Model 221E-150). Table 1 shows the details of the testing procedures used to obtain various properties.

TABLE 1

Summary of Testing and Characterization Methods

| Property/Data | ASTM Method | Instrument Used | Number of Samples | Type of Sample | Comments |
|---|---|---|---|---|---|
| Tensile Properties Modulus Strength (Yield) Elongation (Yield) | D638 | Instron- Model TTC | 5 | Injection Molded Std dog bone shape Tensile bar. (⅛" × ½"6½") | Strain rate of 0.2"/minute |
| Izod Impact Room Temperature (23.3° C.) or Low Temperature (−28° C.) | D256 | Izod Impact Tester | 3 | Injection Molded Flex Bars (⅛" × ½" × 5") | Three bars tested at both sprue and vent ends. All samples were notched using standard size. |
| Specific Gravity | D792 | Standard Balance | 2 | Injection Molded Bar | Calculated from weight loss of the sample after immersing in distilled water. |
| Heat Distortion Temperature | D648 | Standard Heat Deflection Bath | 2 | Injection Molded Flex Bar (⅛" × ½"/5") | Tested at 264 psi. Sample immersed in silicone. Bath heated at 2° C./min. Sample bar tested edgewise. Two different conditioning methods used for each composition: (a) 48 hours at 50° C. (b) 24 hours at 70° C. |
| Flexural Properties Modulus Strength (Yield) Strain (Yield) | D790 | Instron Model-TMS | 5 | Injection Molded Flexural Bar (⅛" × ½" × 5") | Cross head speed of 0.5" per minute |

EXAMPLE 1

Vinyl Polymer A and SMA Polymer I were blended in a weight ratio of 40 to 60 respectively, in accordance with the foregoing procedure. Physical properties were run according to the foregoing procedure and the results are shown in Table 2.

TABLE 2

| | |
|---|---|
| PROCESSING (Injection Molding Parameters on Arburg Injection Molding Machine) | |
| Injection Pressure | 16,600 psi |
| Barrel Temperature (Front) | 320° C. |
| Barrell Temperature (Rear) | 350° C. |
| Mold Temperature | 80° F. |
| Nozzle Setting | 50 |
| Linear Mold Shrinkage | 0.003 in/in |
| Specific Gravity | 1.15 |
| MECHANICAL PROPERTIES | |
| Tensile Strength | $5.6 \times 10^3$ psi |
| Tensile Modulus | $3.2 \times 10^5$ psi |
| Elongation | 3.0% |
| Notched Izod Impact (23.3° C.) | 12.2 ft-lbs/in |
| Notched Izod Impact (−28.8° C.) | 2.1 ft-lbs/in |
| Flexural Strength | $10.2 \times 10^3$ psi |
| Flexural Modulus | $3.4 \times 10^5$ psi |
| % Strain | 4.4 |
| Rockwell Hardness | R-94 |
| Shore Durometer Hardness | D-79 |
| Gardner Impact | 288 in-lbs |
| THERMAL PROPERTIES | |
| Linear Thermal Expansion Coefficient | $4.7 \times 10^5$ in/in °F. |
| Heat Distortion Temperature (264 psi) | 76° C. |
| Heat Distortion Temperature (264 psi) (annealed) | 83.3° C. |
| OTHER | |
| Gloss | 92 |
| Water Absorption (24 hours @ 23° C.) | 0.32% |
| BRABENDER DATA | |
| Fusion Time | 24 seconds |
| Maximum Fusion Torque | >7000 meter-grams |
| Equilibrium Torque | 1620 meter-grams |
| Decomposition Time | 15.3 minutes |

EXAMPLES 2–10

Vinyl Polymer B and SMA Polymer I were blended in various proportions and tested for heat distortion temperature and notched izod impact strength in accordance with the above described procedures. The results of these tests are shown in Table 3.

TABLE 3

| Example No. | Composition Vinyl Polymer B: SMA Polymer I | Notched Izod Impact Strength at 23.3° C. ft-lb/inch | Notched Izod Impact Strength at −28.8° C. ft-lb/inch | Heat Distortion Temperature (264 psi) (annealed 48 hrs @ 50° C.) °C. |
|---|---|---|---|---|
| 2 | 80:20 | 9.3 | 0.8 | 69.3 |
| 3 | Repeat 80:20 | 10.0 | 0.9 | 69.5 |
| 4 | 60:40 | 8.1 | 1.0 | 71.5 |
| 5 | Repeat 60:40 | 9.2 | 1.3 | 71.5 |
| 6 | 40:60 | 8.2 | 1.2 | 76.8 |
| 7 | Repeat 40:60 | 8.4 | 1.5 | 76.3 |
| 8 | 20:80 | 6.1 | 1.2 | 85.5 |
| 9 | Repeat 20:80 | 7.1 | 1.6 | 84.8 |
| 10 | Vinyl Polymer B Control | 16.7 | 0.9 | 67 |

EXAMPLES 11–14

Vinyl Polymer B and SMA Polymer I were blended in various proportions. The flexural modulus and flexural strength of these compositions were measured in accord with Table 1. These results are shown in Table 4.

TABLE 4

| Example No. | Composition Vinyl Polymer B: SMA Polymer I | Flexural Strength psi | Flexural Modulus psi × $10^{-5}$ |
|---|---|---|---|
| 11 | 80:20 | 10793 | 3.669 |
| 12 | 60:40 | 10789 | 3.593 |
| 13 | 40:60 | 11197 | 3.679 |
| 14 | 20:80 | 10990 | 3.654 |

EXAMPLES 15–16

The tensile modulus and tensile strength of Vinyl Polymer B:SMA Polymer I (40:60) and Vinyl polymer B:SMA Polymer II (40:60) blend compositions were tested according to the foregoing procedure. The results are shown in Table 5

TABLE 5

| Example No. Mechanical Property | 15 Vinyl Polymer B:SMA Polymer (40:60) | 16 Vinyl Polymer B:SMA Polymer II (40:60) |
|---|---|---|
| Tensile Modulus psi × $10^{-5}$ | 3.461 | 3.520 |
| Tensile Strength | 5468 | 6014 |
| Percent Elongation | 2.86 | 3.210 |

EXAMPLES 17–20

The blends of Vinyl Polymer A were prepared with the SMA Polymer I and SMA Polymer II. The effect of accelerated weathering on these compositions was studied using an Atlas weatherometer having a Xenon arc lamp. The results of these studie are shown in Tables 6, 7, 8 and 9.

TABLE 6

Accelerated Weathering Data on 60:40 Blend of Vinyl Polymer A:SMA Polymer I (Example 17)

| Property | Original | 500 Hr | 1000 Hr | 1500 Hr | 2000 Hr |
|---|---|---|---|---|---|
| Heat Distortion Temperature °C. | 72 | 74 | 75 | 75 | 75 |
| Notched Izod Impact at 23.3° C. ft-lb/inch | 15.3 | 10.3 | 10.6 | 10.5 | 9.8 |
| Notched Izod Impact | 2.3 | 0.6 | — | — | — |

TABLE 6-continued

Accelerated Weathering Data on 60:40 Blend of
Vinyl Polymer A:SMA Polymer I (Example 17)

| Property | Original | 500 Hr | 1000 Hr | 1500 Hr | 2000 Hr |
|---|---|---|---|---|---|
| at −28.8° C. ft-lb/inch | | | | | |

TABLE 7

Accelerated Weathering Data on 40:60 Blend of
Vinyl Polymer A:SMA Polymer I (Example 18)

| Property | Original | 500 Hr | 1000 Hr | 1500 Hr | 2000 Hr |
|---|---|---|---|---|---|
| Heat Distortion Temperature °C. | 78 | 81 | 82 | 83 | 84 |
| Notched Izod Impact at 23.3° C. ft-lb/inch | 11.8 | 8.2 | 7.9 | 7.7 | 7.3 |
| Notched Izod Impact at −28.8° C. ft-lb/inch | 2.3 | 0.5 | — | — | — |

TABLE 8

Accelerated Weathering Data on 60:40 Blend of
Vinyl Polymer A:SMA Polymer II (Example 19)

| Property | Original | 500 Hr | 1000 Hr | 1500 Hr | 2000 Hr |
|---|---|---|---|---|---|
| Heat Distortion Temperature °C. | 72 | 73 | 74 | 75 | 75 |
| Notched Izon Impact at 23.3° C. ft-lb/inch | 12.9 | 8.8 | 9.0 | 9.1 | 8.8 |
| Notched Izon Impact at −28.8° C. ft-lb/inch | 2.5 | 0.8 | — | — | — |

TABLE 9

Accelerated Weathering Data on 40:60 Blend of
Vinyl Polymer A:SMA Polymer II (Example 20)

| Property | Original | 500 Hr | 1000 Hr | 1500 Hr | 2000 Hr |
|---|---|---|---|---|---|
| Heat Distortion Temperature °C. | 80 | 84 | 86 | 87 | 89 |
| Notched Izod Impact at 23.3° C. ft-lb/inch | 9.3 | 6.7 | 6.2 | 5.5 | 4.9 |
| Notched Izod Impact at −28.8° C. ft-lb/inch | 2.2 | 0.5 | — | — | — |

EXAMPLE 21

A 40:60 blend of Vinyl Polymer B and SMA Polymer I was thermally aged at 70° C. for 3 months. The effect of thermal aging on the properties of this blend was tested after 1 day, 1 week, 1 month and 3 month at 70° C. The results of these tests are tabulated in Table 10. This blend retained essentially all of its impact strength after thermal aging at 70° C. for 3 months.

TABLE 10

Thermal Aging Data on Vinyl Polymer:SMA Polymer I
(40:60) Blend (Example 21)

| | | Thermal Aging at 70° C. | | | |
|---|---|---|---|---|---|
| Property | Original | 1 Day | 1 Week | 1 Month | 3 Months |
| Heat Distortion Temperature °C. | 77 | 86.3 | 88 | 92 | 95 |
| Notched Izod Impact at 23.3° C. ft-lb/inch | 7.8 | 8.0 | 7.5 | 7.2 | 7.5 |
| Notched Izod Impact at −28.8° C. ft-lb/inch | 2.2 | 2.0 | 2.3 | 1.4 | — |

EXAMPLES 22–29

Vinyl Polymer B was blended with either SMA Polymer I or SMA Polymer II in various proportions shown in Tables 11 and 12. A sample weighing 55 grams of each of these compositions was tested by Brabender Torque Rheometer. The results are shown in Tables 11 and 12.

TABLE 11

Brabender Torque Rheometer Data

| Example No.: | 22 | 23 | 24 | 25 |
|---|---|---|---|---|
| Vinyl Polymer B:SMA Polymer I | 80:20 | 60:40 | 40:60 | 20:80 |
| Ram Pressure (grams) | 7500 | 7500 | 7500 | 7500 |
| R.P.M. | 73 | 73 | 73 | 73 |
| Max Fusion Peak (minutes) | 0.35 | 0.35 | 0.4 | 0.3 |
| Max Fusion Torque (meter-grams) | — | 5890 | >7000 | >7000 |
| Equilibrium Torque (meter-grams) | 990 | 1320 | 1620 | 1750 |
| Decomposition (minutes) | 23.65 | 20.65 | 15.3 | >45 |
| Held at (°F.) | 400 | 400 | 400 | 400 |

TABLE 12

Brabender Torque Rheometer Data

| Example No.: | 26 | 27 | 28 | 29 |
|---|---|---|---|---|
| Vinyl Polymer B:SMA Polymer II | 80:20 | 60:40 | 40:60 | 20:80 |
| Ram Pressure (grams) | 7500 | 7500 | 7500 | 7500 |
| R.P.M. | 63 | 63 | 63 | 63 |
| Max Fusion Peak (minutes) | 0.2 | 0.3 | 0.5 | 0.35 |
| Max Fusion Torque (meter-grams) | 6554 | 6860 | 7610 | 9000 |
| Equilibrium Torque (meter-grams) | 1450 | 1500 | 1600 | 1900 |
| Decomposition (minutes) | 31.2 | 25.7 | >45 | >45 |
| Held at (°F.) | 400 | 400 | 400 | 400 |

EXAMPLES 30–41

The SMA polymers may be blended with other commercially known high impact PVC compositions such as Geon 85856 and Ethyl 7042. Results of such blends are shown in Tables 13 and 14. The blend were prepared as described above and tested as shown in Table 1.

TABLE 13

| | | Notched Izod Impact Strength at | | Heat Distortion Temperature annealed 48 hrs @ 50° C. |
|---|---|---|---|---|
| Example No. | Composition Geon 85856: | 23.3° C. ft-lb/inch | −28.8° C. ft-lb/inch | (annealed 24 hrs @ 70° C.) °C. |
| | SMA Polymer I | | | |
| 30 | 80:20 | 7.3 | 0.64 | 72 (78) |
| 31 | 60:40 | 2.6 | 0.68 | 74 (80) |
| 32 | 40:60 | 3.1 | 0.89 | 80 (87) |
| 33 | 20:80 | 4.1 | 1.1 | 89 (96) |
| | SMA Polymer II | | | |

TABLE 13-continued

| Example No. | Composition Geon 85856: | Notched Izod Impact Strength at | | Heat Distortion Temperature annealed 48 hrs @ 50° C. (annealed 24 hrs @ 70° C.) °C. | |
|---|---|---|---|---|---|
| | | 23.3° C. | −28.8° C. | | |
| | | ft-lb/inch | | | |
| 34 | 80:20 | 4.1 | 0.56 | 72 | (78) |
| 35 | 60:40 | 2.3 | 0.73 | 74 | (81) |
| 36 | 40:60 | 2.6 | 0.75 | 83 | (90) |
| 37 | 20:80 | 3.4 | 0.83 | 94 | (101) |

TABLE 14

| Example No. | Composition Ethyl 7042: SMA Polymer I | Notched Izod Impact Strength at | | Heat Distortion Temperature annealed 24 hrs @ 70° C. (annealed 48 hrs @ 50° C.) °C. | |
|---|---|---|---|---|---|
| | | 23.3° C. | −28.8° C. | | |
| | | ft-lb/inch | | | |
| 38 | 80:20 | 1.7 | 0.4 | 79 | (73) |
| 39 | 60:40 | 1.9 | 0.5 | 81 | (74) |
| 40 | 40:60 | 2.7 | 0.7 | 83 | (77) |
| 41 | 20:80 | 4.5 | 1.2 | 95 | (87) |

The foregoing examples show that blends of a vinyl halide polyolefin polymer with the above-mentioned tested using the procedures listed in Table 1, and the results are shown in Table 15.

TABLE 15

| | | Mechanical Properties | | | | | | | | |
|---|---|---|---|---|---|---|---|---|---|---|
| | | Notched Izod Impact at | | | Tensile | | | | | |
| Example No. | Composition Vinyl Polymer A: SMA Polymer III | 23.3° C. | −28.8° C. | Modulus $\times 10^{-5}$ psi | Strength $\times 10^{-3}$ psi | Elongation at Yield % | UL-94 Rating | | HDT (@ 264 psi) | |
| | | ft-lb/inch | | | | | 1/8" | 1/16" | * | ** |
| 42 | 100:0 | 20.9 | 2.36 | 2.92 | 4.78 | 3.16 | V-O | V-O | 68 | 68 |
| 43 | 80:20 | 3.4 | 0.95 | 3.04 | 4.85 | 3.12 | V-O | V-O | 76 | 71 |
| 44 | 60:40 | 3.1 | 0.89 | 3.05 | 4.84 | 2.90 | NC | NC | 79 | 72 |
| 45 | 40:60 | 5.0 | 1.24 | 3.18 | 4.93 | 2.47 | NC | NC | 85 | 77 |
| 46 | 20:80 | 5.2 | 1.01 | 3.22 | 4.57 | 1.98 | NC | NC | 93 | 85 |
| 47 | 0:100 | 4.2 | 1.10 | 3.17 | 4.67 | 1.97 | NC | NC | 98 | 92 |

*annealed 24 hours @ 70° C.
**annealed 48 hours @ 50° C.

SMA polymers I and II have excellent thermal aging properties and also a good balance of impact strength and heat distortion temperatures. These blends are superior to the blends of vinyl halide polyolefin polymer and ABS (acrylonitrile-butadiene-styrene) polymer with respect to weathering resistance.

EXAMPLES 48–51

Blends of Vinyl Polymer A and SMA Polymer III were prepared in various proportions using the above described blending procedures. These blends were tested for heat distortion temperature and notched izod impact strengths. The results are given in Table 16.

TABLE 16

| Example No. | Composition Vinyl Polymer A:SMA Polymer III | Notched Izod Impact Strength at | | Heat Distortion Temperature (264 psi) (annealed 48 hrs @ 50° C.) °C. |
|---|---|---|---|---|
| | | 23.3° C. | −28.8° C. | |
| | | ft-lb/inch | | |
| 48 | 80:20 | 2.7 | 0.9 | 70 |
| 49 | 60:40 | 2.9 | 0.9 | 72 |
| 50 | 40:60 | 3.0 | 1.1 | 78 |
| 51 | 20:80 | 5.4 | 1.0 | 85 |

EXAMPLES 42–47

Blends of various proportions of Vinyl Polymer A and SMA Polymer III were prepared as indicated in Table 15 using the above-described blending procedures. The blends and the individual components were

EXAMPLES 52–56

Blends of Vinyl Polymer B with SMA Polymer III were prepared using above described procedures. Table 17 lists the properties of these blends measured according to the procedures described in Table 1.

TABLE 17

| Example No. | Composition Vinyl Polymer A:SMA Polymer III | Notched Izod Impact Strength at 23.3° C. ft-lb/inch | Notched Izod Impact Strength at −28.8° C. ft-lb/inch | Heat Distortion Temperature (264 psi) (annealed 48 hrs @ 50° C.) °C. |
|---|---|---|---|---|
| 52 | 80:20 | 2.2 | 0.8 | 69.5 |
| 53 | 60:40 | 3.1 | 0.8 | 71.3 |
| 54 | 40:60 | 3.4 | 0.9 | 77.8 |
| 55 | 20:80 | 5.0 | 0.8 | 84.8 |
| 56 | 0:100 | 4.6 | 0.8 | 89 |

EXAMPLE 57

A blend of Vinyl Polymer B and SMA Polymer III in the proportion of 40:60 was prepared. This blend was thermally aged at 70° C. The properties of this blend were measured after 1 day, 1 week, 1 month and 3 months at 70° C., and are listed in Table 18.

TABLE 18
Thermal Aging at 70° C. of Vinyl Polymer B:SMA Polymer III (40:60) Blend (Example 57)

| Property | Original | 1 Day | 1 Week | 1 Month | 3 Months |
|---|---|---|---|---|---|
| Heat Distortion Temperature °C. | 78 | 83.8 | 92 | 93 | 97 |
| Notched Izod Impact at 23.3° C. ft-lb/inch | 2.7 | 2.3 | 2.2 | 2.6 | 2.3 |
| Notched Izod Impact at −28.8° C. ft-lb/inch | 1.2 | 1.1 | 1.2 | 1.0 | 0.8 |

EXAMPLES 58-59

Vinyl Polymer A was blended with SMA Polymer III in proportions indicated in Tables 19 and 20. Accelerated weathering studies on these blends were carried out using an Atlas weatherometer having a Xenon arc lamp. Samples were collected at every 500 hours up to 2000 hours and tested for heat distortion temperature and notched izod impact strength. The results are shown in Tables 19 and 20.

TABLE 19
Accelerated Weathering Data on Vinyl Polymer A:SMA Polymer III (60:40) Blend (Example 58)

| Property | Original | 500 Hr | 1000 Hr | 1500 Hr | 2000 Hr |
|---|---|---|---|---|---|
| Heat Distortion Temperature °C. | 72 | 73 | 74 | 76 | 76 |
| Notched Izod Impact at 23.3° C. ft-lb/inch | 7.6 | 4.8 | 4.4 | 4.2 | 3.72 |
| Notched Izod Impact at −28.8° C. ft-lb/inch | 1.6 | 1.7 | — | — | — |

TABLE 20
Accelerated Weathering Data on Vinyl Polymer A:SMA Polymer III (40:60) Blend (Example 59)

| Property | Original | 500 Hr | 1000 Hr | 1500 Hr | 2000 Hr |
|---|---|---|---|---|---|
| Heat Distortion Temperature °C. | 78 | 79 | 84 | 86 | 83 |
| Notched Izod Impact at 23.3° C. ft-lb/inch | 8.7 | 4.8 | 4.2 | 4.3 | 3.64 |
| Notched Izod Impact at −28.8° C. ft-lb/inch | 1.5 | 0.8 | — | — | — |

EXAMPLES 60-67

Vinyl Polymer A was blended with SMA Polymer III in proportions indicated in Table 21. Vinyl Polymer B was blended with SMA Polymer III in proportions indicated in Table 22. 55-gram samples of each blend were dried and tested by Brabender Torque Rheometer, the results of which are listed in Tables 21 and 22.

TABLE 21
Brabender Torque Rheometer Data

| Example No: | 60 | 61 | 62 | 63 |
|---|---|---|---|---|
| Vinyl Polymer A:SMA Polymer III | 80:20 | 60:40 | 40:60 | 20:80 |
| Ram Pressure | 7500 | 7500 | 7500 | 7500 |
| R.P.M. | 63 | 63 | 63 | 63 |
| Max Fusion Peak (seconds) | 34.4 | 27.6 | 23.8 | 21.8 |
| Max Fusion torque (meter-gram) | 5100 | 4650 | 5100 | 6000 |
| Equilibrium Torque (meter-gram) | 850 | 800 | 800 | 1000 |
| Decompositon (minutes) | 31.1 | 31.8 | 31.6 | 26.9 |
| Stock Held at °F. | 400 | 400 | 400 | 400 |

TABLE 22
Brabender Torque Rheometer Data

| Example No: | 64 | 65 | 66 | 67 |
|---|---|---|---|---|
| R.P.M. | 63 | 63 | 63 | 63 |
| Max Fusion Peak (seconds) | 19.6 | 15.6 | 22.2 | 22.8 |
| Max Fusion Torque (meter-gram) | 4800 | 5500 | 6950 | 7550 |
| Equilibrium Torque (meter-gram) | 1000 | 950 | 950 | 1100 |
| Decomposition (minutes) | 34.2 | 32.8 | 30.4 | 24.4 |
| Stock Held at °F. | 400 | 400 | 400 | 400 |

The foregoing examples show that blends of a vinyl halide polyolefin polymer with the above mentioned SMA polymer III have good balance of heat distortion temperature and high impact strengths. It has also been found that these blends exhibit good processability and significant miscibility. The blends in the present invention display significantly higher heat distortion temperatures than the blends of the vinyl halide polyolefin polymer and ABS (acrylonitrile-butadiene-styrene) polymer.

EXAMPLES 68-79

Vinyl Polymer B was blended with SMA Polymers IV and V in proportions indicated in Tables 23 and 24, respectively. 55-gram samples of each blend were dried and tested by Brabender Torque Rheometer, the results of which are listed in Tables 23 and 24.

TABLE 23

| Example No. | Composition Vinyl Polymer B: SMA Polymer IV | Notched Izod Impact Strength at 23.3° C. ft-lb/inch | Notched Izod Impact Strength at −28.8° C. ft-lb/inch | Heat Distortion Temperature (264 psi) (annealed 48 hrs @ 50° C.) °C. | |
|---|---|---|---|---|---|
| 68 | 100:0 | 20.4 | 0.9 | 67 | (68) |
| 69 | 80:20 | 0.96 | 0.47 | 71 | (77) |
| 70 | 60:40 | 0.61 | 0.23 | 75 | (81) |
| 71 | 40:60 | 0.55 | 0.19 | 84 | (93) |
| 72 | 20:80 | 0.84 | 0.20 | 93 | (99) |
| 73 | 0:100 | 0.49 | 0.37 | 94 | (101) |

TABLE 24

| Example No. | Composition Vinyl Polymer B SMA Polymer V | Notched Izod Impact Strength at 23.3° C. ft-lb/inch | Notched Izod Impact Strength at −28.8° C. ft-lb/inch | Heat Distortion Temperature (264 psi) (annealed 48 hrs @ 50° C.) °C. | |
|---|---|---|---|---|---|
| 74 | 100:0 | 20.4 | 0.9 | 67 | (68) |
| 75 | 80:20 | 0.7 | 0.57 | 71 | (77) |
| 76 | 60:40 | 0.28 | 0.36 | 76 | (81) |
| 77 | 40:60 | 0.24 | 0.27 | 87 | (95) |
| 78 | 20:80 | 0.19 | 0.20 | 97 | (104) |
| 79 | 0:100 | 0.46 | 0.35 | 105 | (108) |

The foregoing examples show that blends of a vinyl halide polyolefin polymer with the above mentioned SMA polymers IV and V, have high heat distortion temperatures. It has also been found that these blends exhibit good processability. The blends in the present invention display significantly higher heat distortion temperatures than the blends of the vinyl halide polyolefin polymer and ABS (acrylonitrile-butadiene-styrene) polymer.

EXAMPLES 80–87

The SMA Polymer III was blended with other commercially known high impact PVC compositions such as Geon 85856 (B. F. Goodrich Co.), and Ethyl 7042 (Ethyl Corporation). Results on such blends are shown in Tables 25 and 26. The blends were prepared as described above and tested as shown in Table 1.

TABLE 25

HDT and Impact Data on Geon 85856 Blends with SMA Polymer III

| Example No. | Composition Geon 85856:SMA Polymer III | Notched Izod Impact Strength at 23.3° C. ft-lb/inch | Notched Izod Impact Strength at −28.8° C. ft-lb/inch | Heat Distortion Temperature (264 psi) (annealed 48 hrs @ 50° C.) °C. | |
|---|---|---|---|---|---|
| 80 | 80:20 | 1.0 | 0.61 | 72 | (78) |
| 81 | 60:40 | 3.3 | 0.84 | 74 | (81) |
| 82 | 40:60 | 4.8 | 0.69 | 80 | (88) |
| 83 | 20:80 | 3.7 | 0.61 | 87 | (95) |

TABLE 26

HDT and Impact Data on Ethyl 7042 Blends with SMA Polymer III

| Example No. | Composition Ethyl 7042:SMA Polymer III | Notched Izod Impact Strength at 23.3° C. ft-lb/inch | Notched Izod Impact Strength at −28.8° C. ft-lb/inch | Heat Distortion Temperature (264 psi) (annealed 48 hrs @ 50° C.) °C. | |
|---|---|---|---|---|---|
| 84 | 80:20 | 1.0 | 0.3 | 79 | (72) |
| 85 | 60:40 | 1.0 | 0.5 | 81 | (73) |
| 86 | 40:60 | 1.0 | 0.5 | 83 | (77) |
| 87 | 20:80 | 1.7 | 0.8 | 95 | (87) |

The foregoing examples illustrate that blends of different high impact PVC formulations with various SMA polymers exhibit good impact strengths. These blends also display improved heat distortion temperatures.

We claim:

1. A polymer composition comprising a vinyl halide hydrocarbon polyolefin graft polymer, and a copolymer of a monovinyl aromatic compound and an anhydride of an ethylenically unsaturated dicarboxylic acid.

2. The polymer composition of claim 1 wherein the vinyl halide-hydrocarbon polyolefin graft polymer comprises the product of bulk liquid phase polymerization of vinyl halide monomer alone or in combination with up to 50% by weight based on the total weight of monomer of another ethylenically unsaturated monomer copolymerizable therewith, in the presence of a free radical initiator compound for said polymerization, and about 0.05% to about 20% by weight, based upon said vinyl halide monomer, of a hydrocarbon olefin trunk polymer.

3. The polymer composition of claim 2 wherein the vinyl halide is vinyl chloride.

4. A polymer composition comprising a vinyl chloride polyolefin graft polymer wherein the polyolefin is present in a proportion of about 2 to about 20 weight percent based on the weight of vinyl chloride, and a copolymer of monovinyl aromatic compound and an anhydride of an ethylenically unsaturated dicarboxylic acid, wherein the copolymer comprises about 50 to 95 mole percent of monovinyl aromatic compound and 5 to 50 mole percent of said anhydride.

5. The polymer composition of claim 4 wherein the polyolefin is present in a proportion of about 5 to about 18 weight percent based on the weight of vinyl chloride.

6. The polymer composition of claim 5 wherein the polyolefin is a terpolymer of ethylene propylene and a diene monomer.

7. The polymer composition of claim 4, wherein the copolymer is modified with about 5 to 40 weight percent of a rubber based on the weight of copolymer and rubber.

8. The polymer composition of claim 7 wherein the copolymer comprises styrene and maleic anhydride, and wherein the rubber is selected from the group consisting of homopolymers of conjugated dienes, copolymers of said dienes with up to 50 weight percent of one or more monoolefinically unsaturated monomers, ethylene-propylene-diene terpolymer rubbers, acrylate diene copolymer rubbers, and mixtures thereof.

9. The polymer composition of claim 4 wherein the vinyl chloride polyolefin graft polymer is present in a proportion of about 40 to about 60 weight percent based on the weight of polymer components.

10. A polymer composition comprising a vinyl chloride polyolefin graft polymer wherein the polyolefin is present in a proportion of about 2 to about 20 weight percent based on the weight of vinyl chloride, and a copolymer of a monovinyl aromatic compound and an anhydride of an ethylenically unsaturated dicarboxylic acid, wherein the copolymer comprises about 50 to 95 weight percent of monovinyl aromatic compound, 5 to 30 weight percent of said anhydride and 0 to 20 weight percent of a copolymerizable monomer.

11. The polymer composition of claim 10 wherein the polyolefin is present in a proportion of about 5 to about 18 weight percent based on the weight of vinyl chloride.

12. The polymer composition of claim 11 wherein the polyolefin is a terpolymer of ethylene, propylene and a diene monomer.

13. The polymer composition of claim 10 wherein the copolymer is modified with about 5 to about 25 percent by weight of a rubber having a glass transition temperature below 0° C., based on the weight of copolymer and rubber.

14. The polymer composition of claim 13 wherein the copolymer comprises styrene and maleic anhydride, and wherein the copolymer has blended therewith a composition comprising a graft copolymer of from 20 to 40% by weight of a monomer selected from the group comprising methyl methacrylate and acrylonitrile and 80 to 60% by weight of a vinyl aromatic monomer said copolymer being grafted onto from 10 to 60%, based on the weight of the composition, of a substrate rubber having a glass transition temperature below 0° C.

15. The polymer composition of claim 12 wherein the vinyl chloride polyolefin graft polymer is present in a proportion of about 40 to about 60 weight percent based on the weight of polymer components.

* * * * *